United States Patent
Vokaliga et al.

(10) Patent No.: US 11,210,245 B2
(45) Date of Patent: Dec. 28, 2021

(54) DATA TRANSMISSION TECHNIQUES BETWEEN SYSTEMS HAVING DIFFERENT COMMUNICATION SPEEDS

(71) Applicant: EMC IP Holding Company LLC, Hopkinton, MA (US)

(72) Inventors: Deepak Vokaliga, Hopkinton, MA (US); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 16/155,305

(22) Filed: Oct. 9, 2018

(65) Prior Publication Data
US 2020/0110717 A1    Apr. 9, 2020

(51) Int. Cl.
*G06F 13/20*    (2006.01)
*H04L 5/14*    (2006.01)

(52) U.S. Cl.
CPC ............ *G06F 13/20* (2013.01); *H04L 5/1446* (2013.01); *G06F 2213/0008* (2013.01); *G06F 2213/0036* (2013.01)

(58) Field of Classification Search
None
See application file for complete search history.

(56) References Cited

U.S. PATENT DOCUMENTS

| 5,544,347 A | 8/1996 | Yanai et al. |
| 5,742,792 A | 4/1998 | Yanai et al. |
| 6,968,369 B2 | 11/2005 | Veprinsky et al. |

(Continued)

FOREIGN PATENT DOCUMENTS

| CN | 106911388 A | * | 6/2017 | |
| CN | 107872309 A | * | 4/2018 | |
| EP | 3547150 A1 | * | 10/2019 | ............. H04L 43/16 |

OTHER PUBLICATIONS

'Universal Serial Bus Specification' Revision 2.0, Apr. 27, 2000, pp. i,ii,22,23,26,36,40-43,57,71-75,142,149-154,159,195-197,205,225-227,280-281,297-299,324-327. (Year: 2000).*

(Continued)

*Primary Examiner* — Steven G Snyder
(74) *Attorney, Agent, or Firm* — Muirhead and Saturnelli, LLC

(57) ABSTRACT

Techniques for transmitting data may comprise: receiving a first data transfer rate indicating a communication rate at which a first entity communicates with a second entity over a communications fabric; receiving a second data transfer rate indicating a communication rate at which the second entity communicates with the first entity over the communications fabric; and performing first processing to send first data from the first entity to the second entity over the communications fabric, said first processing including: determining whether the first data transfer rate is greater than the second data transfer rate; and responsive to determining the first data transfer rate is greater than the second transfer rate, performing second processing by the first entity that controls and limits, in accordance with the second data transfer rate, a rate at which the first data is transmitted from the first entity to the second entity.

19 Claims, 9 Drawing Sheets

(56) References Cited

U.S. PATENT DOCUMENTS

| | | | |
|---|---|---|---|
| 7,054,883 B2 | 5/2006 | Meiri et al. | |
| 7,774,424 B1* | 8/2010 | Bailey | G06F 13/385 |
| | | | 709/211 |
| 7,779,291 B2 | 8/2010 | Yoder et al. | |
| 8,539,197 B1* | 9/2013 | Marshall | G06F 13/00 |
| | | | 711/173 |
| 8,644,133 B2* | 2/2014 | Diab | H04J 3/16 |
| | | | 370/220 |
| 9,037,826 B1* | 5/2015 | Brooker | G11C 7/22 |
| | | | 711/167 |
| 9,137,005 B2* | 9/2015 | Weide | H04L 5/1446 |
| 9,252,968 B2* | 2/2016 | Lusted | H04L 12/413 |
| 9,258,082 B2* | 2/2016 | Lusted | H04L 1/24 |
| 9,455,797 B2* | 9/2016 | Lusted | H04L 1/004 |
| 10,929,316 B2* | 2/2021 | Rowlands | G06F 13/4221 |
| 10,938,730 B2* | 3/2021 | Smith | H04L 47/22 |
| 2008/0165694 A1* | 7/2008 | Sauber | H04L 5/1438 |
| | | | 370/252 |
| 2010/0075613 A1* | 3/2010 | Brown | H04W 28/22 |
| | | | 455/69 |
| 2013/0138830 A1* | 5/2013 | Fang | H04L 47/263 |
| | | | 709/233 |
| 2013/0343400 A1* | 12/2013 | Lusted | H04L 12/413 |
| | | | 370/419 |
| 2014/0223265 A1* | 8/2014 | Lusted | H04L 1/0017 |
| | | | 714/776 |
| 2014/0229651 A1* | 8/2014 | Weide | H04L 5/1446 |
| | | | 710/309 |
| 2014/0258813 A1* | 9/2014 | Lusted | H04L 1/0009 |
| | | | 714/776 |
| 2015/0341277 A1* | 11/2015 | Gravel | H04L 7/033 |
| | | | 370/468 |
| 2017/0024295 A1* | 1/2017 | Klughart | G06F 16/183 |
| 2019/0303281 A1* | 10/2019 | Firoozshahian | G06F 12/0684 |
| 2020/0320025 A1* | 10/2020 | Rowlands | G06F 13/1668 |

OTHER PUBLICATIONS

'What is link training and when should I use it?' by Casey Morrison, Apr. 11, 2017. (Year: 2017).*

'Auto-Negotiation' IEEE 802.3 HSSG—Coeur d'Alene, ID, Rich Taborek, Jun. 1, 1999. (Year: 1999).*

'IEEE Draft P802.3ap/Draft2.3' Feb. 15, 2006. (Year: 2006).*

* cited by examiner

DATA TRANSMISSION TECHNIQUES BETWEEN SYSTEMS HAVING DIFFERENT COMMUNICATION SPEEDS

BACKGROUND

Technical Field

This application generally relates to data transmission between systems or components operating at different communication speeds.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of transmitting data comprising: receiving a first data transfer rate indicating a communication rate at which a first entity communicates with a second entity over a communications fabric; receiving a second data transfer rate indicating a communication rate at which the second entity communicates with the first entity over the communications fabric; and performing first processing to send first data from the first entity to the second entity over the communications fabric, said first processing including: determining whether the first data transfer rate is greater than the second data transfer rate; and responsive to determining the first data transfer rate is greater than the second transfer rate, performing second processing by the first entity that controls and limits, in accordance with the second data transfer rate, a rate at which the first data is transmitted from the first entity to the second entity. The method may include issuing, from the first entity to the second entity, a write operation requesting that the second entity write the first data on a storage device of the second entity. The second processing may include the first entity limiting, in accordance with the second data transfer rate, write I/O operations and an amount of write data written by the write I/O operations. The first entity may sent the write I/O operations at a frequency whereby an average write data transfer rate of the write data written by the write I/O operations does not exceed the second data transfer rate. The second processing may include: partitioning a single application write I/O operation that writes the first data having a first size into multiple write I/O operations each of a smaller size than the first size; and issuing the multiple write I/O operations to the second entity at a selected frequency whereby an average write data transfer rate of the first data written by the multiple write I/O operations does not exceed the second data transfer rate. The method may include performing third processing to send second data from the second entity to the first entity over the communications fabric, and said third processing may include: determining whether the second data transfer rate is greater than the first data transfer rate; and responsive to determining the second data transfer rate is greater than the first transfer rate, performing fourth processing that controls and limits, in accordance with the first data transfer rate, a rate at which the second data is transmitted from the second entity to the first entity. The method may include issuing, from the first entity to the second entity, a read operation requesting that the second entity read and return the second data to the first entity, wherein the second data is stored on a storage device of the second entity. The fourth processing may include the first entity sending a command to the second entity to control and limit data transmissions sent from the second entity to the first entity in accordance with the first data transfer rate. The command may instruct the second entity to use the first data transfer rate as a maximum threshold and not allow data transmissions, sent from the second entity to the first entity to the second entity, to exceed the first data transfer rate. The fourth processing may include the first entity limiting, in accordance with the first data transfer rate, read I/O operations and an amount of read data requested by the read I/O operations. The first entity may send the read I/O operations at a frequency whereby an average read data transfer rate of the read data requested by the read I/O operations does not exceed the first data transfer rate. The second processing may include: partitioning a single application read I/O operation that read the second data having a second size into multiple read I/O operations each of a smaller size than the second size; and issuing the multiple read I/O operations to the second entity at a selected frequency whereby an average read data transfer rate of the first data read by the multiple read I/O operations does not exceed the first data transfer rate. The first entity may be a host or data storage system, and the second entity may be a host or data storage system, and the method may include: sending the first data transfer rate from the first entity to the second entity; and sending the second data transfer rate from the second entity to the first entity. The communications fabric may include a switch having memory used as a buffer for temporarily storing data transmitted between the first entity and the second entity. The method may include transmitting the first data from the first entity to the second entity over the communications fabric, wherein said transmitting the first data may include: transmitting the first data from the first entity to the switch; storing the first data in a memory buffer of the switch; and transmitting the first data from the memory buffer of the switch to the second entity. The method may include transmitting the second data from the second entity to the first entity over the communications fabric, wherein said transmitting the second data may include: transmitting the second data from the second entity to the switch; storing the second data in a memory buffer of the switch; and transmitting the second data from the memory buffer of the switch to the first entity. The first entity may be a first data storage system and the second entity may be a second data storage system, and wherein the first data may be stored on a first storage device on the first data storage system and a second storage device of the second data storage system may be maintained as a mirror of the first storage device, and wherein a replication data facility of the first data storage system may send the first data to the second data storage system to mirror a write of the first data to the first storage device on the second storage device of the second data storage system. The first entity may be a first data storage system and the second entity may be a second data storage system, and wherein the first data may be stored on a first storage device on the first data storage system, and wherein data on the first storage device may be migrated, by an application on the first data storage system, to a second storage device on the second data storage system, and wherein the application on the first data storage system may control migration of data of the first storage device and may send the first data to the second storage device of the second data storage system.

In accordance with another aspect of techniques herein is a system comprising: a processor; and a memory that includes code stored therein that when executed, performs s method of transmitting data comprising: receiving a first data transfer rate indicating a communication rate at which a first entity communicates with a second entity over a communications fabric; receiving a second data transfer rate indicating a communication rate at which the second entity communicates with the first entity over the communications fabric; performing first processing to send first data from the first entity to the second entity over the communications fabric, said first processing including: determining whether the first data transfer rate is greater than the second data transfer rate; and responsive to determining the first data transfer rate is greater than the second transfer rate, performing second processing by the first entity that controls and limits, in accordance with the second data transfer rate, a rate at which the first data is transmitted from the first entity to the second entity.

In accordance with another aspect of techniques herein is a computer readable medium comprising code stored thereon that, when executed, performs a method of transmitting data comprising: receiving a first data transfer rate indicating a communication rate at which a first entity communicates with a second entity over a communications fabric; receiving a second data transfer rate indicating a communication rate at which the second entity communicates with the first entity over the communications fabric; performing first processing to send first data from the first entity to the second entity over the communications fabric, said first processing including: determining whether the first data transfer rate is greater than the second data transfer rate; and responsive to determining the first data transfer rate is greater than the second transfer rate, performing second processing by the first entity that controls and limits, in accordance with the second data transfer rate, a rate at which the first data is transmitted from the first entity to the second entity.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
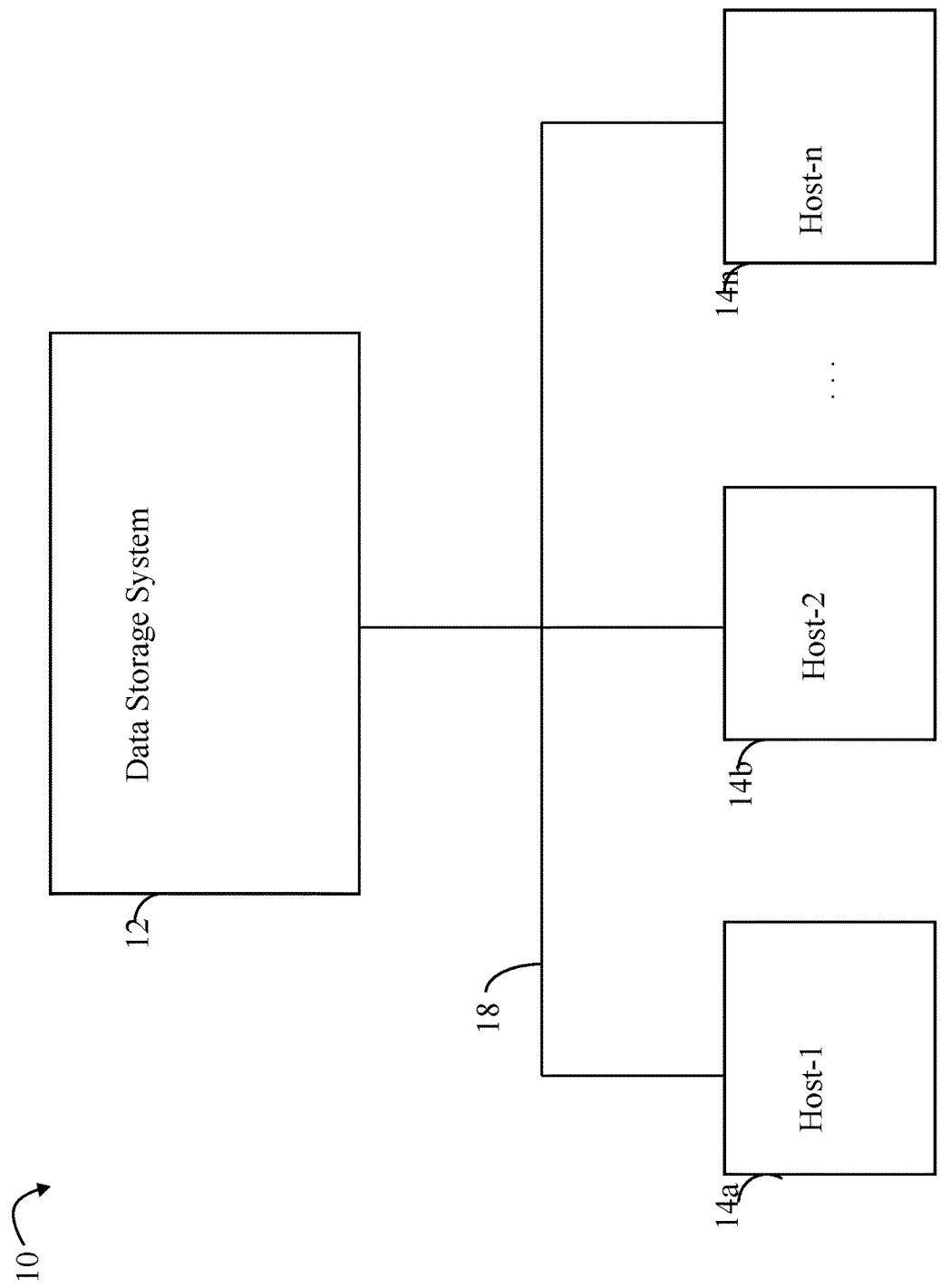
FIGS. 1, 3, 4, 5 and 6 are examples of embodiments of systems and components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell EMC™ PowerMAX™ data storage system, as well one or more other data storage systems as may vary with the embodiment.

Figure 2A:
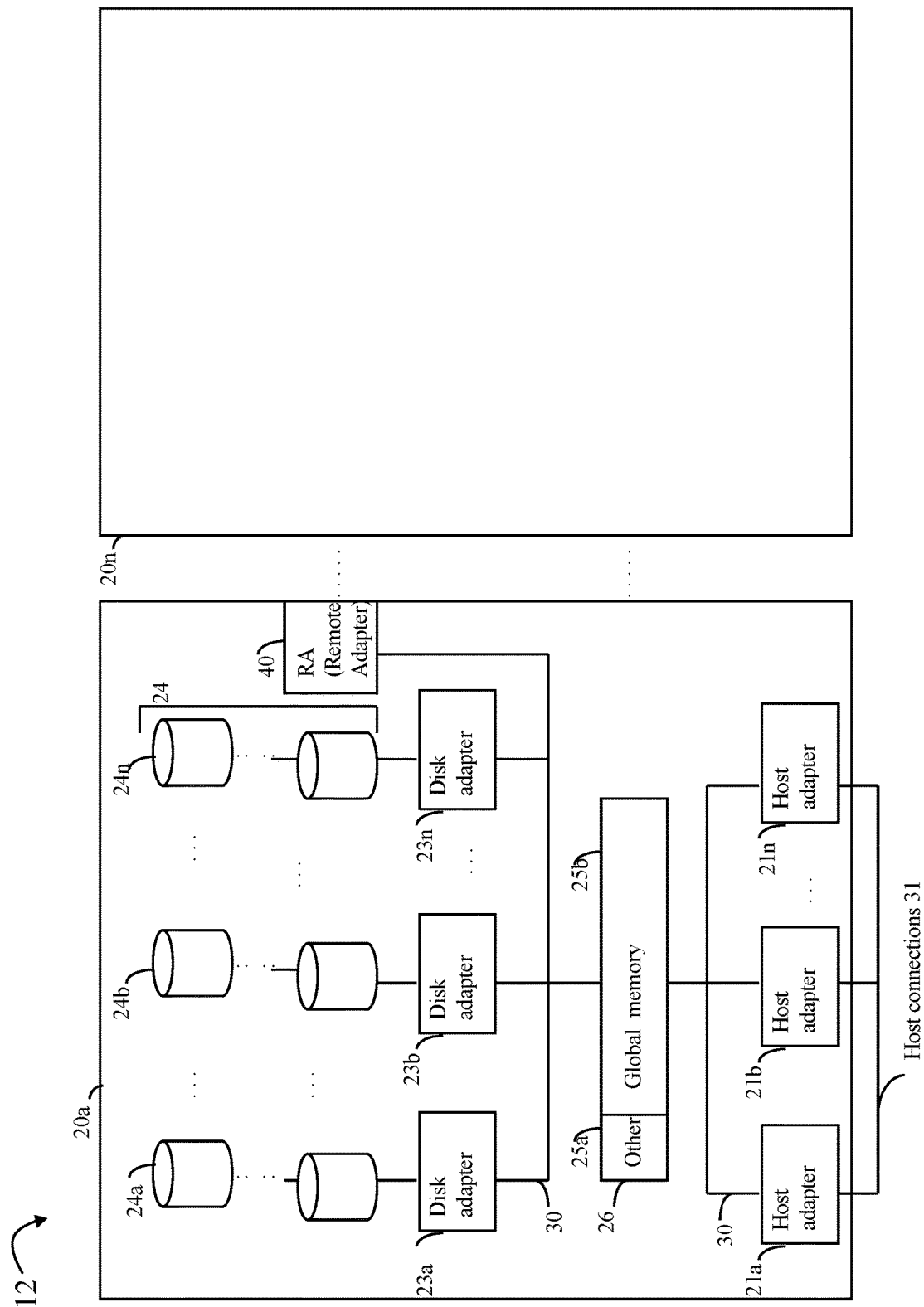
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as a data storage array, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems. For example, in an embodiment, the storage systems 20a-20n may each include one or more Remote Data Facility (RDF) adapter units 40. An RDF product may be used to copy data from one storage system to another. For example, if a host writes data to a first storage system (e.g., a local storage system), it may be desirable to copy that data to a second storage system provided in a different location (e.g., a remote storage system). The RAs of two data storage systems, such as 20a and 20n, may communicate over an RDF link (not illustrated) between the two data storage systems to transfer data between the two data storage systems. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
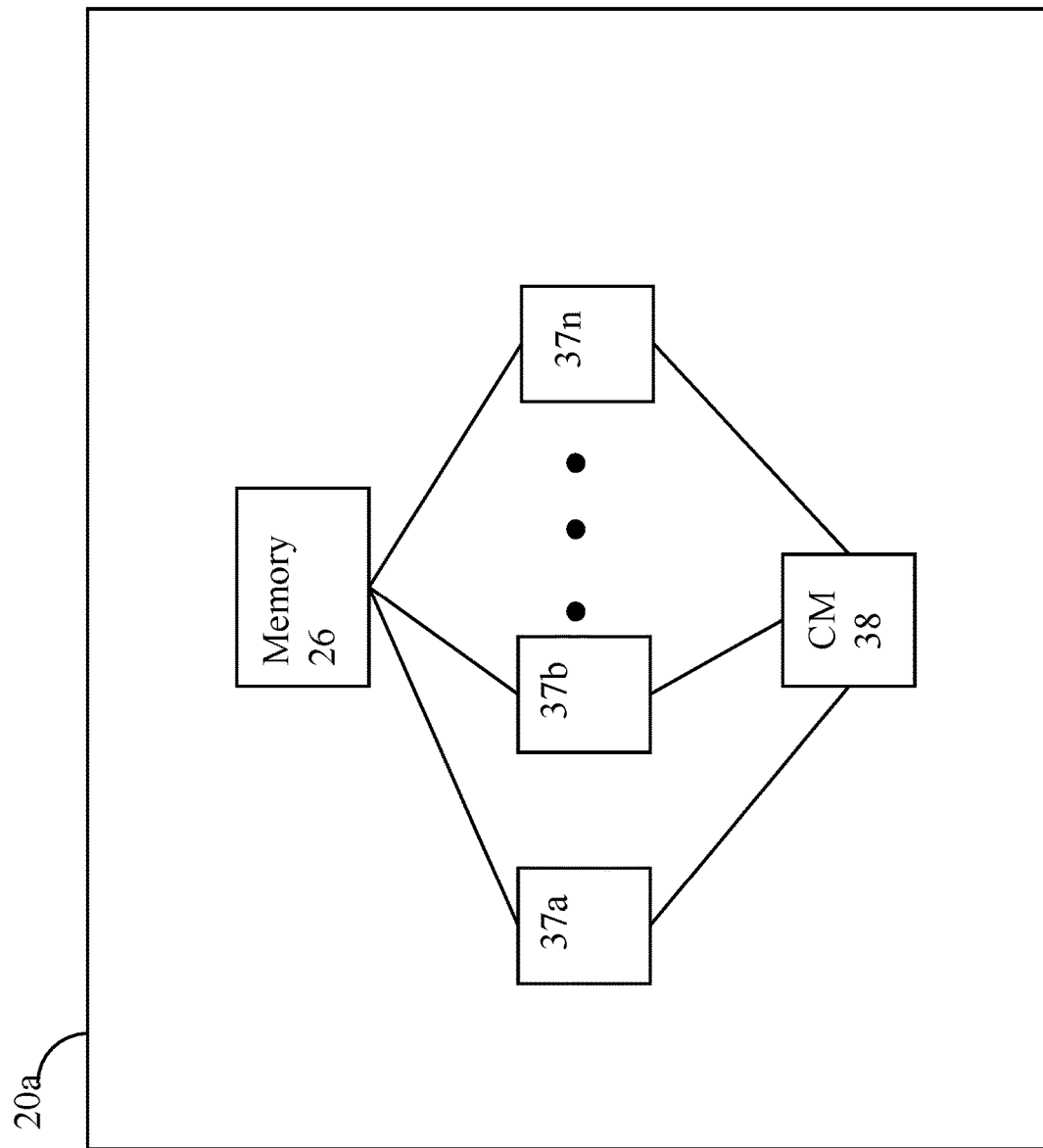
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
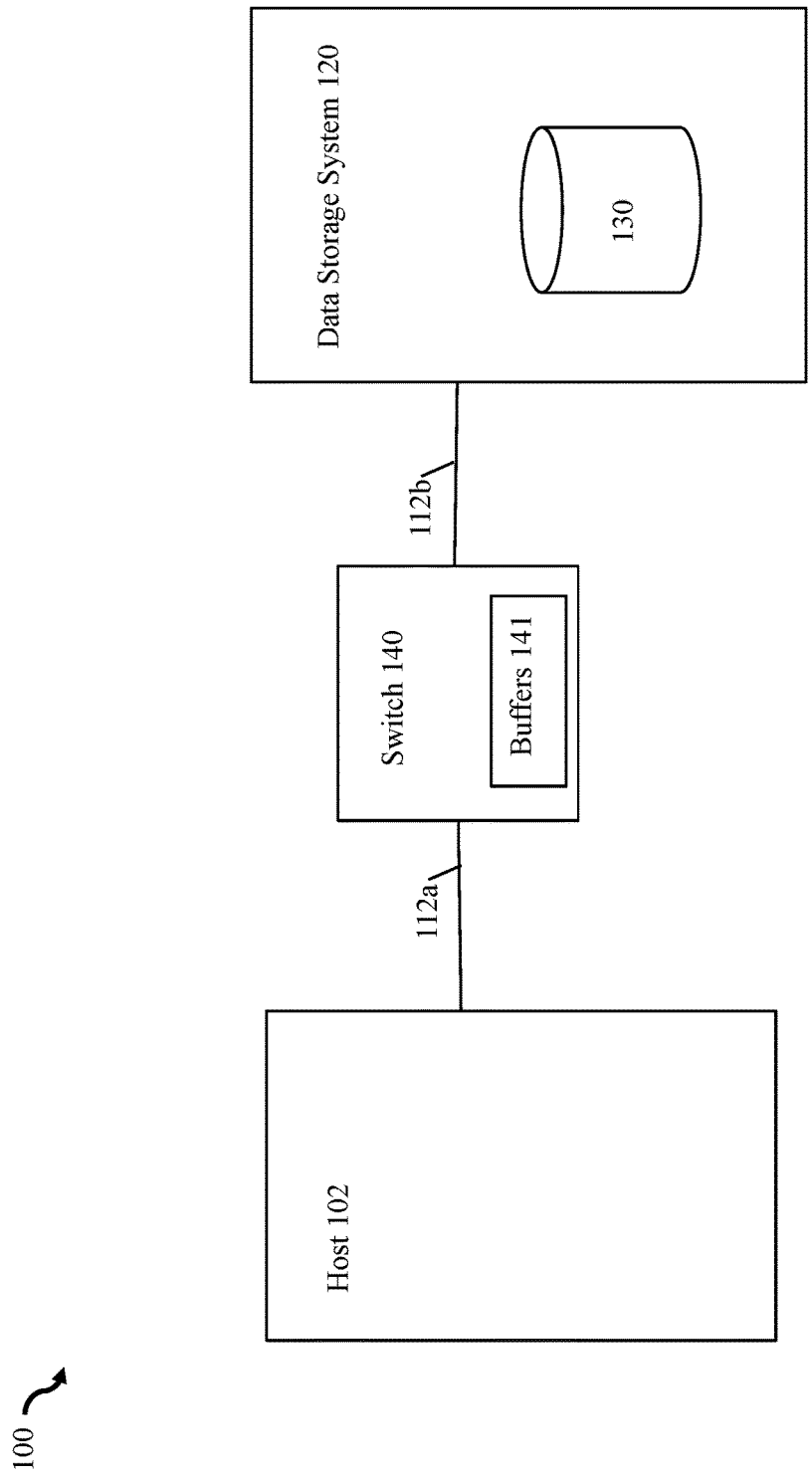

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Element 112a denotes a connection between the host 102 and switch 140. Element 112b denotes a connection between the data storage system 120 and the switch 140. Element 130 may represent one of more physical storage devices of the data storage system 120, such as one or more of a rotating disk drive, flash-based or other solid state storage device, and the like, where the one or more physical storage devices 130 may be configured to include logical devices or LUNs. It should be noted that the example 100 includes only a single host, a single data storage system, and a fabric including a single switch for purposes of simplicity to illustrate the techniques herein. However, systems implementing techniques herein may including multiple hosts, multiple data storage systems, additional components besides the switch in the communication or switching fabric, and the like.

It should be noted that following paragraphs and examples may refer to particular examples using switch 140 having a switching fabric, for simplicity of illustration. Element 140 may be a single switch having a switching fabric, a multi-switch having a multi-switch fabric and the like. Thus, element 140 may more generally denote a network having its own connectivity fabric or network fabric where the network may include one or more components, such as one or more switches, providing the connectivity between the host 102 and data storage system 120.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN having its physical storage provisioned on physical storage devices 130 of the data storage system 120. Consistent with discussion elsewhere herein, element 112a may be a connection from a port of host 102 to a port of the switch 140, and element 112b may be a connection from a port of the switch 140 to a port of the data storage system 120.

In connection with the SCSI standard, a path may be defined between two ports, an initiator port, such as of the host 102, to a target port, such as of the data storage system 120, where the path is through a communications fabric, such as the switch 140. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports) and a second endpoint which is a port of an HA in the data storage system. Over each such path, one or more LUNs may be visible or exposed to the host initiator through the target port of the data storage system.

The host 102 may issue I/O commands (e.g., such as read and write I/O commands that read data from and/or write data to a LUN) to the data storage system 120 where such commands may be communicated over the connections 112a, 112b, through switch 140, forming the path between 102 and 120. The data storage system 120 may receive the I/O command, perform any needed processing to service the I/O command, and return a response, including any requested data, to the host 102. For a read command, the host 102 requests data that is returned by the storage system 120 to the host 102 over the path and its connections 112a, 112b. In particular, returned read data is sent over 112b from the data storage system 120 to the switch 140, and then over 112a from the switch 140 to the host 102. For a write command, the host 102 sends write data to the storage system 120 over the path and its connections 112a, 112b. In particular, write read data is sent by host 102 over 112a to the switch 140, and then over 112b from the switch 140 to the data storage system 120 (whereby the data storage system then writes the write data to physical storage 130).

Generally, the switch 140 may include buffers 141 used to temporarily store data that is communicated between the host 102 and data storage system 120. Buffers 141 may be memory or any form of suitable physical storage capable of storing the data. For example, write data sent from the host 102 to data storage system 120 may first be sent (over 112a) from the host 102 to switch 140, where the write data is temporarily stored in a buffer of the switch 140. Subsequently, the write data stored in the buffer of the switch 140 is then sent (over 112b) to the data storage system 120. As another example, read data that is requested by the host 102 and returned/sent from data storage system 120 to the host 102 may first be sent (over 112b) from the data storage system 120 to switch 140, where the read data is temporarily stored in a buffer of the switch 140. Subsequently, the read data stored in the buffer of the switch 140 is then returned (over 112a) to the host 102.

The host 102 may negotiate a first communication rate or speed, such as a data transfer rate or data bandwidth rate, with the switch 140 denoting the speed or rate at which data is transmitted over connection or link 112a (between the switch 140 and host 102). In a similar manner, the data storage system 120 may negotiate a second communication rate or speed, such as a data transfer rate or data bandwidth rate, with the switch 140 denoting the speed or rate at which data is transmitted over connection or link 112b (between the switch 140 and data storage system 120). A slow drain problem, causing network congestion and reduced network and switch performance, may result in cases where there is a bandwidth or speed mismatch in connection with negotiated communication speeds of connections 112a and 112b. Generally, the connection or link having the faster communication rate or speed may consume an excessive amount of switch buffers.

To further illustrate with reference to FIG. 3, assume the host 102 negotiates a first communication speed of 8 GBs per second with the switch 140 for data transmission over 112a, and the data storage system 120 negotiates a second communication speed of 16 GBs per second with the switch 140 for data transmission over 112b. The host 102 may issue read I/Os over 112a, 112b to data storage system 120. In response, the data storage system 120 may return requested read data to the host 102. In particular, the data storage system 120 transmits the requested read data at a speed or rate of 16 GBs/second over 112b to the switch 140 where the read data may be stored in buffers 141 until transmitted over 112a to the host 102. In one aspect, the read data may be characterized as "drained" from the switch 140 and transmitted over 112a to host 102 at the slower first communication speed of 8 GBs/second. In connection with such disparate or mismatched communication speeds of 16 GBs/second and 8 GB s/second, an excessive amount of read data may be buffered in the buffers 141 of the switch 140. Such conditions may result due to the data storage system 120 transmitting the read data over 112b to the switch 140 at 16 GBs/second, which is twice the rate at which the buffered read data in switch 140 is sent to the host 102 over 112a (having a communication speed or rate of 8 GBs/second). Generally such a scenario as just described illustrating the slow drain problem may result in cases where the buffered data in the switch is drained over 112a at a much slower speed or rate in comparison to the speed or rate at which the data is sent to the switch over 112b.

The slow drain problem may also occur where there is a relative communication rate or speed disparity between 112*a* and 112*b* where the communication speed or rate of 112*a* is larger than the communication speed or rate of 112*b*. To further illustrate with reference to FIG. 3, assume the host 102 negotiates a first communication speed of 16 GBs per second with the switch 140 for data transmission over 112*a*, and the data storage system 120 negotiates a second communication speed of 8 GBs per second with the switch 140 for data transmission over 112*b*. The host 102 may issue write I/Os over 112*a*, 112*b* to data storage system 120. In particular, the host 102 may send the write data over 112*a* to switch 140 at a rate of 16 GBs/second where the write data is stored in buffers 141 until transmitted to the data storage system 120 over 112*b*. In one aspect, the write data may be characterized as "drained" from the switch 140 and transmitted over 112*b* to data storage system 120 at the slower communication speed of 8 GBs/second. In connection with such disparate or mismatched communication speeds of 16 GBs/second (112*a*) and 8 GBs/second (112*b*), an excessive amount of write data may be buffered in the buffers 141 of the switch 140. Such conditions may result due to the host 102 transmitting the write data over 112*a* to the switch 140 at 16 GBs/second, which is twice the rate at which the buffered write data in switch 140 is sent to the data storage system 120 over 112*b* (having a communication speed or rate of 8 GBs/second). Generally such a scenario as just described illustrating the slow drain problem may result in cases where the buffered data in the switch is "drained" over 112*b* at a much slower speed or rate in comparison to the speed or rate at which the data is sent to the switch over 112*a*.

What will be described in following paragraphs are techniques that may be used to resolve and/or avoid slow drain scenarios, such as discussed above, which may occur due to a disparity or mismatch in the different communication speeds with which different entities, such as hosts and data storage systems, communicate with the network or communication fabric, such as the switch 140. Generally, techniques herein may be used between two entities referred to as an initiator and a target. The initiator may control the communications between the initiator and target, such as in the case where the initiator initiates or sends the read and write I/Os to the target. The embodiment of FIG. 3 illustrates a first embodiment in which techniques described in following paragraphs may be utilized with an initiator that is host 102 and a target that is data storage system 120.

Figure 4:
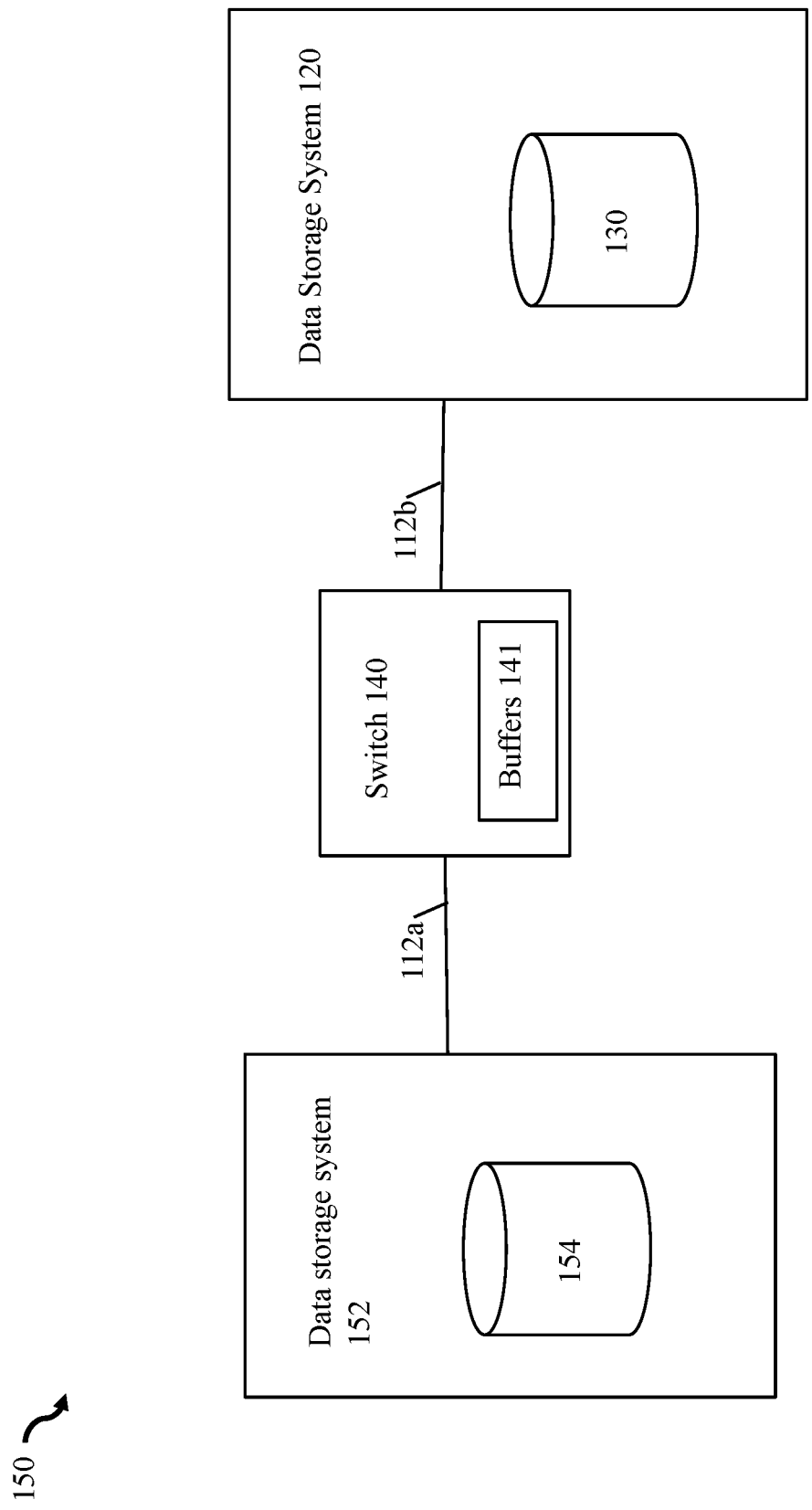

With reference to FIG. 4, shown is another example 150 of an embodiment in which techniques herein may be utilized. In the example 150, both target and initiator are data storage systems. The example 150 includes components as described in FIG. 3 with the difference that the initiator is a data storage system rather than a host. In the example 150, the initiator is data storage system 152 and the target is data storage system 120. Element 154 denotes physical storage devices of data storage system 152. Element 154 denotes physical storage devices similar to those represented by element 130 and as described elsewhere herein.

Figure 5:
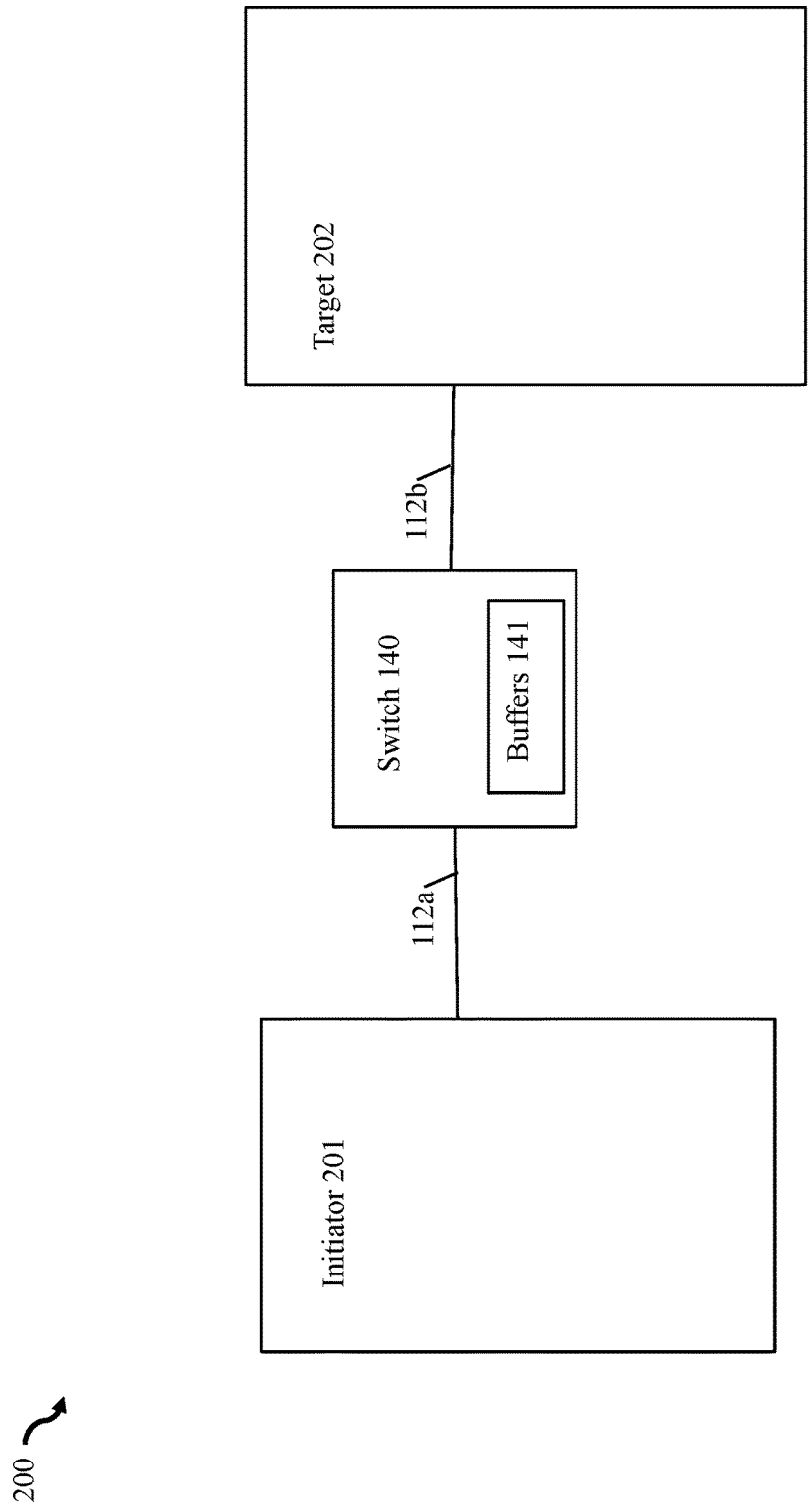

With reference to FIG. 5, shown is another example 200 of an embodiment in which techniques herein may be utilized. The example 200 is a more generalized illustration of components as described in connection with FIGS. 3 and 4 where particular instances of initiator and target system are illustrated. The example 200 includes an initiator 201 and target 202. Generally, in connection with techniques herein, an embodiment may include any suitable initiator entity 201 (e.g., such as a host or data storage system) and any suitable target entity 202 (e.g., such as a host or data storage system).

The foregoing embodiments of FIGS. 3, 4 and 5 are examples illustrating different initiator and target entities that may be used in an embodiment in accordance with techniques herein. More generally, the initiator and target entities such as generalized in FIG. 5 may be any suitable component or system included in an arrangement in which the slow drain problem as described herein may occur and wherein such arrangement of components are capable of performing the processing of techniques as described herein. Examples in following paragraphs may refer to particular instances of initiator and target entities for purposes of illustrating techniques herein. However, more generally, techniques illustrated by such examples more generally may be used with any suitable initiator and target entities.

As noted above, following paragraphs describe techniques that may be used to resolve and/or avoid slow drain scenarios that may occur due to a disparity or mismatch in the different communication speeds with which different entities, such as hosts and data storage systems, communicate with the network or communication fabric, such as the switch 140. In such embodiments, the initiator and/or target entities have means to reduce, control or limit the communication speed or rate at which data of I/O operations is transmitted.

Figure 6:
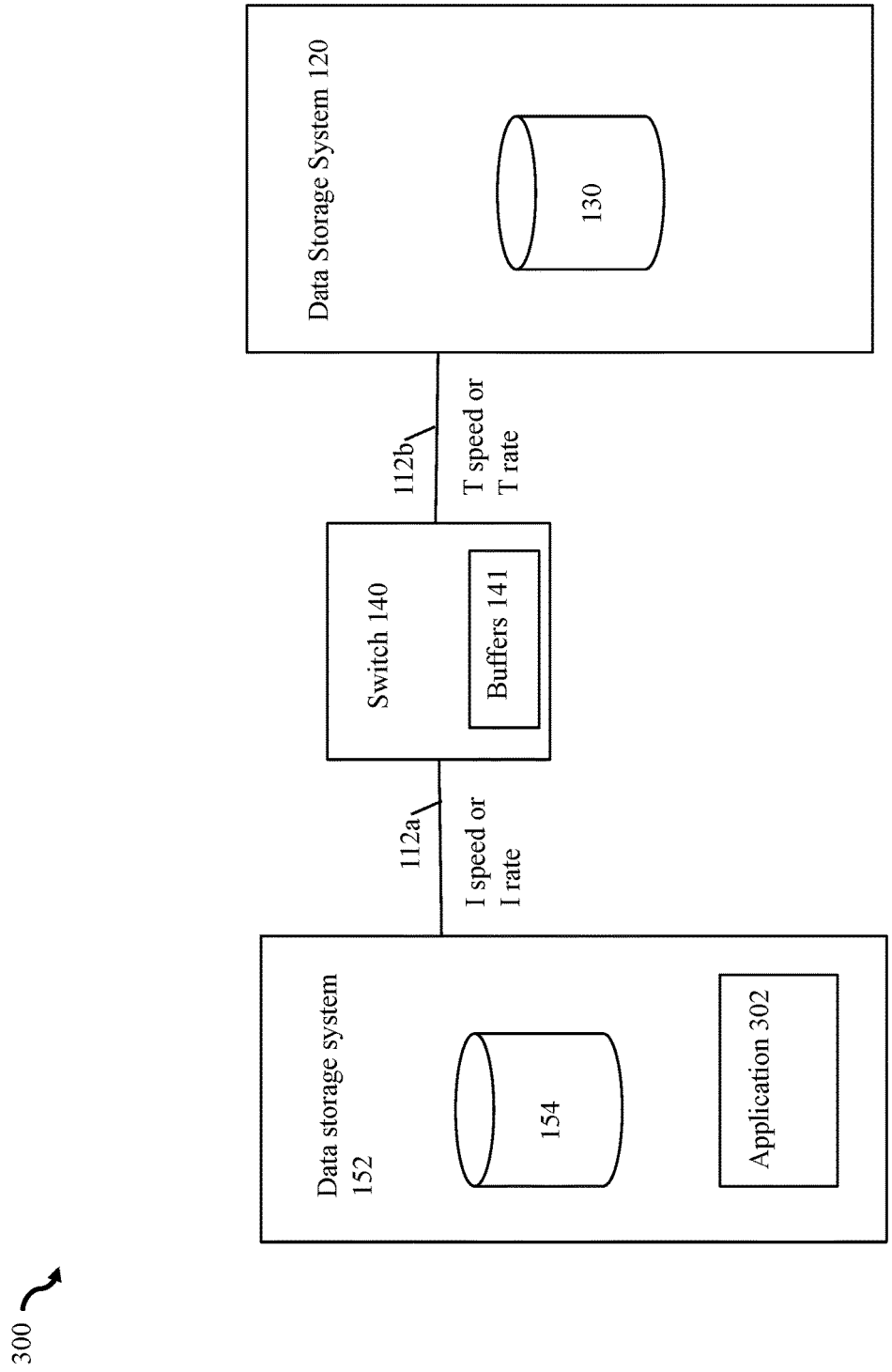

As a first more detailed example, reference is made to FIG. 6 where both the initiator and target are data storage systems, such as data storage arrays. In the example 300 and consistent with above discussion regarding FIG. 4, data storage system 152 is the initiator and data storage system 120 is the target whereby system 152 may issue reads and/or write I/O operations to system 120. In the example 300, the initiator data storage system 152 also includes application 302 which may be a migration or replication application that, respectively, controls the migration or replication of data from system 152 to system 120. For example, application 302 may be a migration application that controls the migration of data from one or more source LUNs, having storage configured from physical storage devices 154, of initiator/source data storage system 152 to one or more target LUNs, having storage configured from physical storage devices 130, of target data storage system 120. In such an embodiment in accordance with techniques herein, the application 302 of the data storage system 152 may control the migration by issuing writes to target data storage system 120 over connections 112*a*, 112*b* through the switch 140. In this example 300, assume that a first communication speed or rate of communication/data transfer (denoted I speed or I rate) between the switch 140 and the initiator system 152 over connection 112*a* is 16 GBs/second. Also, assume that the communication speed or rate of communication/data transfer (denoted T speed or T rate) between the switch 140 and the target system 120 over connection 112*b* is 8 GBs/second. Consistent with discussion above, the slow drain problem or scenario may occur, for example, in connection with writes issued from the data storage system 152 to the data storage system 120 since the I speed or I rate of 16 GBs/second over 112*a* is greater than the T speed or T rate of 8 GBs/second over 112*b*.

In order to avoid or resolve the slow drain scenario in the embodiment of FIG. 6, processing may be performed prior to the application 302 issuing any writes to data storage system 120. Such processing may include the source/initiator data storage system 152 communicating its current I speed or I rate over 112*a* to the target data storage system 120, and may include the target data storage system 120 communicating its current T speed or T rate over 112b to the source/initiator data storage system 152. In at least one embodiment, vendor unique SCSI commands may be used to communicate the current communication speeds or rates (e.g., I speed or I rate and T speed or T rate) between data storage systems 152 and 120. For example, the SCSI log select command may be issued from the initiator data storage system 152 to the target data storage system 120 (over 112a, 112b through switch 140) whereby the initiator system 152 sends parameter information of initiator system 152, such as the I speed or I rate, to the target system 120. Additionally, the SCSI log sense command may be used to communicate the target system 120's communication speed or rate, T speed or T rate, to the initiator system 152. For example, the initiator system 152 may send a SCSI log sense command over 112a, 112b through switch 140 to the target system 120 requesting that the target system 120 return its operational information, such as the target system 120's negotiated communication speed or rate, T speed or T rate, on connection 112b. Although particular commands are mentioned above for purposes of illustration, generally, any suitable command(s) may be used to provide and communicate each of the data storage systems 152 and 120 with the other system's communication speed or rate (e.g., provide system 152 with T speed or T rate of communication between system 120 and switch 140 on connection 112b; and provide system 120 with I speed or I rate of communication between system 152 and switch 140 on connection 112a).

In connection with techniques herein, the initiator system 152 may perform processing to determine whether it needs to limit, reduce or control the rate at which data is transmitted to the target system 120 over 112a and 112b through switch 140. If the initiator system 152 has a faster/greater communication speed on 112a than the target system 120 on 112b (e.g., if I speed or I rate is greater than T speed or T rate), then the initiator system 152 may perform processing to limit the rate at which data is transmitted to the target system 120, such as when issuing writes by the migration application 302 to system 120. In this example, the initiator system 120 may compare its I speed or I rate over 112a to the T speed or T rate of system 120 over 112b and determine that I speed or I rate is greater than T speed or T rate thereby indicating that the initiator system 120 limits or controls the rate at which data is written via write I/Os issued to system 120 over 112a, 112b and through switch 140. In at least one embodiment, the initiator system 152 may limit the rate at which write data is sent to target system 112 in accordance with the T speed or T rate. For example, the initiator system 152 may limit the rate at which write data is sent to target system 112 such that the average data bandwidth or transfer rate at which write data is sent from initiator system 152 to target system 120 does not exceed the T speed or T rate of target system 120 on connection 112b. In this manner, the T speed or T rate communicated from system 120 to system 152 may be used as an upper bound or threshold data transfer rate that should not, on average, be exceeded. In at least one embodiment, the foregoing comparison of communication speeds or rates may further be performed with respect to a specified minimum threshold amount denoting that processing to limit, reduce or control the rate at which data is transmitted to the target system 120 over 112a is performed if the initiator rate or speed (I rate or I speed) exceeds the target rate or speed (T rate or T speed), by at least the specified minimum threshold amount.

In such an embodiment, the initiator system 152 may have one or more control means by which it can control and limit the speed (e.g., rate or bandwidth) of data transmitted to target system 120. For example, in connection with the embodiment in which the application 302 is a migration application, the migration application may have a configurable control parameter that can be set to the desired limit denoting the maximum threshold rate or speed (e.g., can set parameter to T speed or T rate) at which the initiator system 152 sends write data to the target system 120 over 112a, 112b and through switch 140. Thus, such a parameter may be used to control the rate and limit the amount of port bandwidth of system 152 on 112a used in connection with the migration data transfer from source/initiator system 152 to target system 120. As another example, the application 302 may be a data replication facility, such as RDF discussed elsewhere herein, which is used to provide for remote replication of data from system 152 to 120. The RDF facility denoted by 302 may have a configurable flow control parameter or setting that controls the speed or rate of data transmissions in connection with replicating data from system 152 to system 120.

The foregoing parameters are examples of ones that may be specified to control or limit the speed or rate at which data is transmitted from initiator system 152 to target system 120 over the path denoted by 112a, 112b through switch 140. Generally, any one or more suitable parameters of the application, such as associated with the particular initiator port of system 152 of connection 112a, may be used to specify the threshold or maximum limit of the speed or rate of data transmission from initiator system 152 to target system 120 over the foregoing path.

Additionally, an embodiment in accordance with techniques herein may use any suitable means to control and limit the speed or rate of data transmission from initiator system 152 to target system 120 so that the observed speed or rate of data transmission does not exceed the T rate or T speed. For example, in at least one embodiment where the application 302 is a migration application, the application (or more generally initiator 152) may control the rate at which migration data is transmitted to target system 120 by introducing additional delays between consecutive write I/Os writing the migration data from initiator system 152 to target system 120. For example, assume there are 3 write I/Os each which write 32 MBs of data. The initiator 152 may introduce additional delays between the first and second write I/Os and also between the second and third write I/Os so that the average write data/payload bandwidth over a period of time does not exceed the T speed or T rate of 8 MB/second in this example. For example, the initiator 152 may issue the first write that writes 32 MB of data/payload and then wait at least 4 seconds prior to issuing the second write that writes 32 MB of data/payload. In a similar manner, the initiator 152 may issue the second write that writes 32 MB of data/payload and then wait at least 4 second prior to issuing the third write that writes 32 MB of data/payload. In this manner, the average rate at which write data payload is transmitted does not exceed 32 MB/4 seconds, which is 8 MB/second (the T speed or T rate). As another second technique, the initiator may vary the size or amount of write data per write I/O writing the migration data from initiator system 152 to target system 120. In this second technique, the initiator system 152 may partition the application write I/Os into multiple smaller I/Os which are issued at a suitable rate or frequency so that the average rate at which write data payload is transmitted to the target system 120 does not exceed the T speed or T rate. For example, assume the application 302 issues 3 write I/Os each with a write data payload of 32 MB. In connection with this second technique, the initiator 152 may partition the first original application write of 32 MB into 4 smaller write I/Os, each which write 8 MB. With this second technique, the initiator may issue each of the 4 smaller write I/Os (of 8 MB each) at consecutive 1 second intervals whereby the average rate at which write data payload is transmitted to target system 120 is 8 MB/second and does not exceed the T speed or T rate (which is also 8 MB/second in this example). Generally, the initiator may partition each of the original application writes into any suitable number of smaller write I/Os of any suitable size and may issue the smaller write I/Os at a suitable frequency or rate so that the average rate at which write data payload is transmitted to target system 120 over a larger time period is 8 MB/second and does not exceed the T speed or T rate. The amount of delay introduced between consecutive write I/Os and/or the size of the write I/Os may be selected so that the average measured or observed data transfer rate (e.g., such as in GBs/second) of the migrated data does not exceed the specified maximum threshold, T speed or T rate. In connection with such techniques as discussed above, there may be a temporary pooling and use of buffers 141 in the switch 140 until the target system 120 is able to drain write data therefrom. The initiator 152 limits and controls the amount of write data transmitted during a time period thereby allowing the target the chance to drain the write data from the buffers of switch 140 without constantly overwhelming the switch with excessive write data.

The slow drain problem or scenario may also occur in situations where the target system 120 is sending data to the initiator data storage system 152 and the T speed or T rate is greater than the I speed or I rate. For example, the T speed or T rate may be 16 GB s/second and the I speed or I rate may be 8 GBs/second. The slow drain problem or scenario may occur, for example, in connection with the target system 120 returning requested data, such as read I/O data requested by the application 302, to the initiator system 152. In connection with techniques herein, the initiator system may perform processing to determine whether the T speed or T rate (e.g., speed or rate of data transmission on 112b between the switch 140 and target system 120) is greater than the I speed or I rate (e.g., speed or rate of data transmission on 112a between switch 140 and initiator system 152). In at least one embodiment, the foregoing comparison of communication speeds or rates may further be performed with respect to a specified minimum threshold amount denoting that processing to limit, reduce or control the rate at which data is transmitted from the target system 120 over 112b is performed if the target rate or speed (T rate or T speed) exceeds the initiator rate or speed (I rate or I speed), by at least the specified minimum threshold amount.

As a first option where the target data storage system 120 has means or capability to limit the speed or rate of data transmissions to 152, if the T speed or T rate is greater than the I speed or I rate, the initiator system 152 may perform processing to reduce or limit the speed or rate at which the target system 120 returns data to the initiator system 152 over the path. With this first option in at least one embodiment, the initiator system 152 may instruct or request that the target system 120 limit the data transmission rate or speed at which data is sent to the initiator 152 by limiting the data transmission rate or speed from the target system 120 to switch 140 over connection 112b to not exceed a specified maximum threshold, such as the I speed or I rate. In such an embodiment in a manner similar to that as discussed above with respect to the initiator system 152, the target system 120 may have one or more control means by which it can control and limit the speed (e.g., rate or bandwidth) of data transmitted to initiator system 152. For example, the target system 120 may have a configurable control parameter that can be set to the desired limit denoting the maximum threshold rate or speed (e.g., can set parameter to I speed or I rate) at which the target system 120 sends returned read data to the initiator system 152 over 112b. Thus, such a parameter may be used to control the rate and limit the amount of port bandwidth of system 120 on 112b used in connection with sending requested data (e.g., such as read data) to source/initiator system 152 from the target system 120. In at least one embodiment, the initiator system 152 may instruct or request the target system 120 limit the speed or rate at which data is sent to 152 over 112b by issuing a SCSI log select command to the target system 120. The command may include parameter information including a parameter denoting the maximum threshold rate or speed, I rate or I speed. In response to receiving the log select command with the maximum threshold rate or speed, the target system 120 may set one or more configurable parameters that limit and control the speed or rate at which data is transmitted over 112b to the initiator system 152.

Additionally, an embodiment in accordance with techniques herein may use any suitable means to control and limit the speed or rate of data transmission to initiator system 152 from the target system 120, such as over 112b, so that the observed speed or rate of data transmission does not exceed the specified maximum threshold of I rate or I speed. For example, the target system 120 may introduce delays between consecutive points in time at which read data is returned from system 120 to system 152 over 112b and/or varying the size or amount of read data returned at each point in time to the initiator system 152 from target system 120 over 112b. For example, assume the target 120 is returning read data requested in connection with 3 read I/Os from the initiator 152 where each read I/O reads 32 MBs of data. The target 120 may introduce additional delays between the read data returned for the first and second read I/Os and also between the second and third reads I/Os so that the average returned read data bandwidth over a period of time does not exceed the I speed or I rate of 8 MB/second in this example. For example, the target 120 may return the first read I/O's 32 MB of data/payload and then wait at least 4 seconds prior to returning the 32 MB of requested read data for the second read. In a similar manner, the target 120 may return 32 MB of read data for the second read I/O and then wait at least 4 seconds prior to returning the 32 MB of requested read data for the third read I/O. In this manner, the average rate at which read data is transmitted/returned to the initiator 152 does not exceed 32 MB/4 seconds, which is 8 MB/second (the I speed or I rate). As another second technique, the initiator may vary the size or amount of read data returned at different points in time by returning smaller chunks of read data to initiator system 152 from target system 120. In this second technique, target system 152 may partition the per application read I/O data payload into multiple smaller chunks which are returned at a suitable rate or frequency so that the average rate at which read data payload is transmitted from the target system 120 to the initiator 152 does not exceed the I speed or I rate. For example, assume the application 302 issues 3 read I/Os each requesting to read 32 MB of data. In connection with this second technique, the target 120 may partition the requested read data for the first original application read of 32 MB into 4 smaller chunks of 8 MB each. With this second technique, the target may return each of the 4 smaller read data chunks (of 8 MB each) at consecutive 1 second intervals whereby the average rate at which read data payload is transmitted to initiator 152 is 8 MB/second and does not exceed the I speed or I rate (which is also 8 MB/second in this example). Generally, the target may partition each of the original application read I/O data payloads into any suitable number of smaller chunks of any suitable size and may return to the initiator 152 the smaller read data chunks at a suitable frequency or rate so that the average rate at which read data payload is transmitted from target system 120 over a larger time period is 8 MB/second and does not exceed the I speed or I rate. The amount of delay introduced between consecutive points in time at which read data is returned and/or the size of each set of returned read data may be selected so that the average measured or observed data transfer rate (e.g., such as in GBs/second) does not exceed the specified maximum threshold, I speed or I rate.

As a second option, such as when the target data storage system 120 does not have means or capability to limit the speed or rate of data transmissions to 152, if the T speed or T rate is greater than the I speed or I rate, the initiator system 152 may perform alternative processing to reduce or limit the speed or rate at which the target system 120 returns data to the initiator system 152 over the path. With this second option in at least one embodiment, the initiator system 152 may limit or control its issued/requested read I/O rate, or more generally, limit the amount of requested read data per unit of time where such reads are issued by the initiator system 152 over the path denoted by 112a, 112b through switch 140 to system 120. In such an embodiment, the initiator system 152 may monitor and limit the read data request rate (e.g., amount of read data requested per unit of time) so that the initiator system 152 limits the amount and/or size of read I/Os over the path 112a to not exceed a specified maximum threshold, such as the I speed or I rate. In such an embodiment in a manner similar to that as discussed above, the initiator system 152 may have one or more control means by which it can control and limit its requested read data rate (e.g., limit the amount of read data requested per unit of time). In connection with this second option, the initiator system 152 limits the impact of its slower I rate or I speed (slower relative to T speed or T rate) by limiting the rate at which read data is requested from the target system 120.

In this particular example where the I rate or I speed is 8 GBs/second and the T rate or T speed is 16 GBs/second, the initiator system 152 may control or limit the read I/O rate and/or size of each read I/O issued to the target system 120 so that the average measured read rate of requested data does not exceed the I rate or I speed. In other words, the initiator system 152 issues read I/Os at a rate (e.g., frequency) and size within a time period that does not result in exceeding the I rate or I speed of 8 GBs/second. In connection with limiting the amount of read data requested per unit of time, the initiator system 152 may use any suitable technique. For example, the initiator system 152 may introduce delays between consecutive points in time at which read data is requested from system 120/read I/Os are issued to system 120. For example, assume there are 3 read I/Os issued by an application 302 on initiator 152 to the target 120. Each of the 3 read I/Os may read 32 MBs of data. The initiator 152 may introduce additional delays between the first and second read I/Os and also between the second and third read I/Os so that the average read data/payload requested (e.g., bandwidth) over a period of time does not exceed the I speed or I rate of 8 MB/second in this example. For example, the initiator 152 may issue the first read that read 32 MB of data/payload and then wait at least 4 seconds prior to issuing the second read that reads 32 MB of data/payload. In a similar manner, the initiator 152 may issue the second read that reads 32 MB of data/payload and then wait at least 4 second prior to issuing the third read that reads 32 MB of data/payload. In this manner, the average rate at which read data payload is requested by the initiator 152 does not exceed 32 MB/4 seconds, which is 8 MB/second (the I speed or I rate). As another second technique, the initiator may vary the size or amount of read data per read I/O from initiator system 152 to target system 120. In this second technique, the initiator system 152 may partition each of the single application read I/Os into multiple smaller I/Os which are issued at a suitable rate or frequency so that the average rate at which read data payload is requested from the target system 120 does not exceed the I speed or I rate. For example, assume the application 302 issues 3 read I/Os each which request to read 32 MB of data. In connection with this second technique, the initiator 152 may partition the first original application read of 32 MB into 4 smaller read I/Os, each which read 8 MB. With this second technique, the initiator may issue each of the 4 smaller read I/Os (of 8 MB each) at consecutive 1 second intervals whereby the average rate at which read data payload is requested from the target system 120 is 8 MB/second and does not exceed the I speed or I rate (which is also 8 MB/second in this example). Generally, the initiator may partition each of the original application reads into any suitable number of smaller read I/Os of any suitable size, and may issue the smaller read I/Os at a suitable frequency or rate so that the average rate at which read data payload is requested from target system 120 over a larger time period is 8 MB/second and does not exceed the I speed or I rate. Generally, the initiator system 152 may vary the size of each such smaller read I/O at each point in time sent from the initiator system 152 to the target system 120 over 112a. The amount of delay introduced between read I/Os issued to 120 from 152 and/or the size of each such read I/O may be selected so that the average amount of read data requested per unit of time (e.g., average requested read data rate such as in GBs/second) does not exceed the specified maximum threshold, I speed or I rate.

Figure 7:
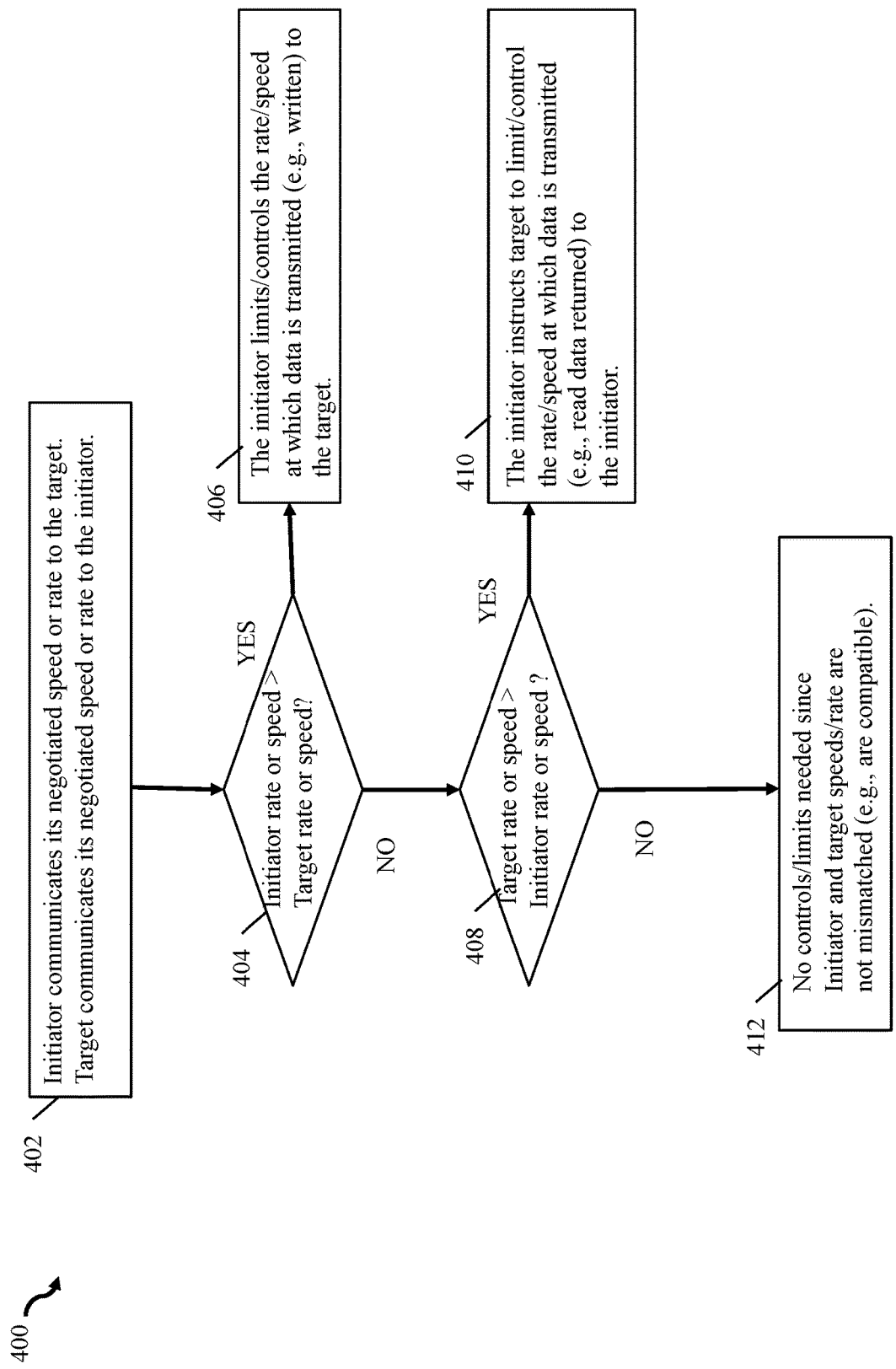
FIGS. 7 and 8 are flowcharts of processing steps that may be performed in an embodiment in accordance with techniques herein.

Referring to FIG. 7, shown is a flowchart summarizing processing that may be performed in an embodiment in accordance with techniques herein. The flowchart 400 includes steps summarizing processing as described above with respect to an initiator and a target. Consistent with discussion above, the initiator may be characterized generally as the entity controlling the communications or data transfers with the target. At step 402, the initiator communicates its negotiated speed or rate (e.g., initiator rate or speed for communications between initiator and network or communications fabric such as over link 112a) to the target, and the target communicates its negotiated speed or rate (e.g., target rate or speed for communications between target and network or communications fabric such as over link 112b) to the initiator. From step 402, control proceeds to step 404 where a determination is made as to whether the initiator rate or speed exceeds the target rate or speed. In at least one embodiment, step 404 comparison (as well as other comparisons in connection with step 408) may further be performed with respect to a specified minimum threshold amount denoting that step 404 evaluates to yes/true if the initiator rate or speed exceeds the target rate or speed, by the specified minimum threshold amount. Otherwise, step 404 evaluates to no/false. If step 404 evaluates to yes/true, control proceeds to step 406. In step 406, the initiator limits or controls the rate/speed at which data is transmitted to the target. For example, step 406 may include the initiator limiting the data transfer rate at which write data is transmitted to the target. If step 404 evaluates to no/false, control proceeds to step 408. In step 408, a determination is made as to whether the target rate or speed exceeds the initiator rate or speed. In at least one embodiment, step 408 comparison (as well as other comparisons in connection with step 404) may further be performed with respect to a specified minimum threshold amount denoting that step 408 evaluates to yes/true if the target rate or speed exceeds the initiator rate or speed, by the specified minimum threshold amount. Otherwise, step 408 evaluates to no/false. If step 408 evaluates to yes/true, control proceeds to step 410 where the initiator instructions the target to limit or control the rate/speed at which data is transmitted to the initiator from the target (e.g., limit the data transfer rate of read data returned to the initiator). Step 410 processing includes the first option of processing as discussed elsewhere herein where the target includes means or capabilities to limit or control data transmitted to the initiator. If step 408 evaluates to no/yes, control proceeds to step 412 where no control limits are needed since the initiator and target speeds/rates are not mismatched (e.g., are compatible).

Figure 8:
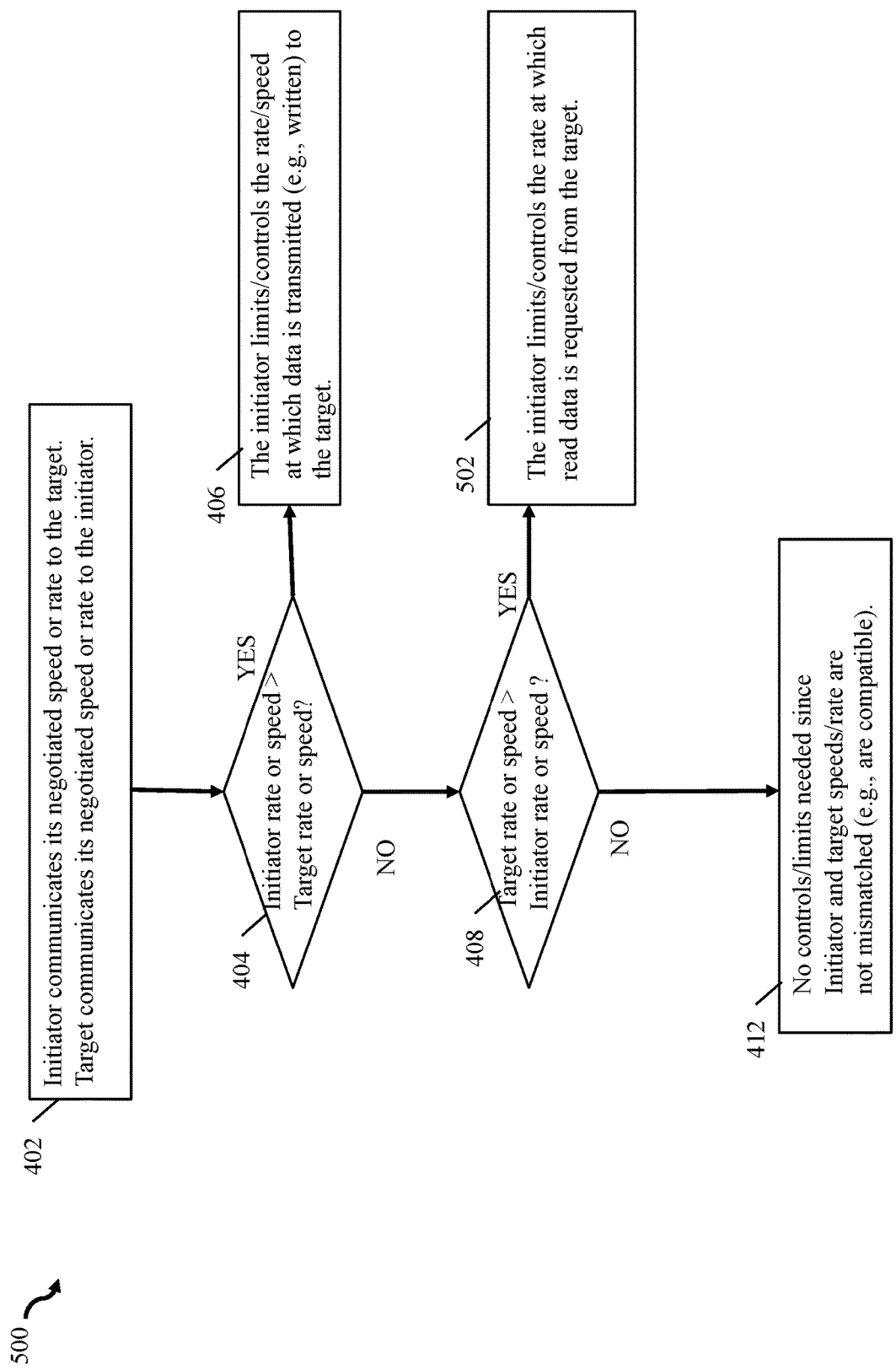

Referring to FIG. 8, shown is a second flowchart of processing steps that may be performed in an embodiment in accordance with techniques herein. The flowchart 500 includes steps 402, 404, 406, 408 and 412 as described above in connection with FIG. 7. Additionally, the flowchart 500 includes step 502 rather than step 410 as in the flowchart of FIG. 7. In the flowchart 500, control proceeds to step 502 if step 408 evaluates to yes/true. In step 502, processing is performed by the initiator to limit or control the rate at which read data is requested from the target (e.g., limit the amount of read data requested per unit of time) as discussed above in connection with the second option of processing as discussed elsewhere herein, for example, where the target may not include means or capabilities to limit or control data transmitted to the initiator.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of transmitting data comprising:
    sending, from a first entity to a second entity over a communications fabric, a first command that includes parameter information denoting a first data transfer rate indicating a negotiated communication rate at which the first entity communicates over a first link with the communications fabric;
    sending, from the first entity to the second entity over the communications fabric, a second command requesting that the second entity return operational information;
    responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
    performing first processing to send first data from the first entity to the second entity over the path that includes the first link, the communications fabric and the second link, said first processing including:
        determining whether the first data transfer rate of the first link between the first entity and the communications fabric is greater than the second data transfer rate of the second link between the second entity and the communications fabric; and
        responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system and a second storage device of the second data storage system is maintained as a mirror of the first storage device, and wherein a replication data facility of the first data storage system sends the first data to the second data storage system to mirror a write of the first data to the first storage device on the second storage device of the second data storage system, and wherein the second processing further includes setting a configurable flow control parameter of the replication data facility that controls the rate at which the first data is transmitted from the first data storage system to the second data storage system in connection with replicating data of the first storage device to the second storage device of the second data storage system.

2. The method of claim 1, where the second processing includes the first entity limiting, in accordance with the second data transfer rate, write I/O (input/output) operations and an amount of write data written by the write I/O operations.

3. The method of claim 2, wherein the first entity sends the write I/O operations at a frequency whereby an average write data transfer rate of the write data written by the write I/O operations does not exceed the second data transfer rate.

4. The method of claim 1, wherein the second processing includes:
    partitioning a single application write I/O (input/output) operation that writes the first data having a first size into multiple write I/O operations each of a smaller size than the first size; and
    issuing the multiple write I/O operations to the second entity at a selected frequency whereby an average write data transfer rate of the first data written by the multiple write I/O operations does not exceed the second data transfer rate.

5. The method of claim 1, wherein the communications fabric includes a switch having memory used as a buffer for temporarily storing data transmitted between the first entity and the second entity.

6. The method of claim 5, further comprising:
transmitting the first data from the first entity to the second entity over the communications fabric, wherein said transmitting the first data includes:
  transmitting the first data from the first entity to the switch;
  storing the first data in a memory buffer of the switch; and
  transmitting the first data from the memory buffer of the switch to the second entity.

7. A method of transmitting data comprising:
sending, from a first entity to a second entity over a communications fabric, a first command that includes parameter information denoting a first data transfer rate indicating a negotiated communication rate at which the first entity communicates over a first link with the communications fabric;
sending, from the first entity to the second entity over the communications fabric, a second command requesting that the second entity return operational information;
responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
performing first processing to send first data from the first entity to the second entity over the path that includes the first link, the communications fabric and the second link, said first processing including:
  determining whether the first data transfer rate of the first link between the first entity and the communications fabric is greater than the second data transfer rate of the second link between the second entity and the communications fabric; and
  responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system, and wherein data on the first storage device is migrated, by an application on the first data storage system, to a second storage device on the second data storage system, and wherein the application on the first data storage system controls migration of data of the first storage device and sends the first data to the second storage device of the second data storage system, and wherein the application has a configurable control parameter that is a limit denoting a maximum threshold at which the first data is transmitted in connection with migration over the path to the second device, wherein the second processing includes setting the configurable control parameter denoting the maximum threshold to the second data transfer rate.

8. A system comprising:
a processor; and
a memory that includes code stored therein that when executed, performs a method of transmitting data comprising:
  sending, from a first entity to a second entity over a communications fabric, a first command that includes parameter information denoting a first data transfer rate indicating a negotiated communication rate at which the first entity communicates over a first link with the communications fabric;
  sending, from the first entity to the second entity over the communications fabric, a second command requesting that the second entity return operational information;
  responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
  performing first processing to send first data from the first entity to the second entity over the path that includes the first link, the communications fabric and the second link, said first processing including:
    determining whether the first data transfer rate of the first link between the first entity and the communications fabric is greater than the second data transfer rate of the second link between the second entity and the communications fabric; and
    responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system and a second storage device of the second data storage system is maintained as a mirror of the first storage device, and wherein a replication data facility of the first data storage system sends the first data to the second data storage system to mirror a write of the first data to the first storage device on the second storage device of the second data storage system, and wherein the second processing further includes setting a configurable flow control parameter of the replication data facility that controls the rate at which the first data is transmitted from the first data storage system to the second data storage system in connection with replicating data of the first storage device to the second storage device of the second data storage system.

9. The system of claim 8, wherein the second processing includes the first entity limiting, in accordance with the second data transfer rate, write I/O (input/output) operations and an amount of write data written by the write I/O operations.

10. The system of claim 9, wherein the first entity sends the write I/O operations at a frequency whereby an average write data transfer rate of the write data written by the write I/O operations does not exceed the second data transfer rate.

11. The system of claim 8, wherein the second processing includes:
  partitioning a single application write I/O (input/output) operation that writes the first data having a first size into multiple write I/O operations each of a smaller size than the first size; and
  issuing the multiple write I/O operations to the second entity at a selected frequency whereby an average write data transfer rate of the first data written by the multiple write I/O operations does not exceed the second data transfer rate.

12. The system of claim 8, wherein the communications fabric includes a switch having memory used as a buffer for temporarily storing data transmitted between the first entity and the second entity, and wherein the method further comprises:
  transmitting the first data from the first entity to the second entity over the communications fabric, wherein said transmitting the first data includes:
    transmitting the first data from the first entity to the switch;
    storing the first data in a memory buffer of the switch; and
    transmitting the first data from the memory buffer of the switch to the second entity.

13. A non-transitory computer readable medium comprising code stored thereon that, when executed, performs a method of transmitting data comprising:
  sending, from a first entity to a second entity over a communications fabric, a first command that includes parameter information denoting a first data transfer rate indicating a negotiated communication rate at which the first entity communicates over a first link with the communications fabric;
  sending, from the first entity to the second entity over the communications fabric, a second command requesting that the second entity return operational information;
  responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
  performing first processing to send first data from the first entity to the second entity over the path that includes the first link, the communications fabric and the second link, said first processing including:
    determining whether the first data transfer rate of the first link between the first entity and the communications fabric is greater than the second data transfer rate of the second link between the second entity and the communications fabric; and
    responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system and a second storage device of the second data storage system is maintained as a mirror of the first storage device, and wherein a replication data facility of the first data storage system sends the first data to the second data storage system to mirror a write of the first data to the first storage device on the second storage device of the second data storage system, and wherein the second processing further includes setting a configurable flow control parameter of the replication data facility that controls the rate at which the first data is transmitted from the first data storage system to the second data storage system in connection with replicating data of the first storage device to the second storage device of the second data storage system.

14. A system comprising:
  a processor; and
  a memory comprising code stored thereon that, when executed, performs a method of transmitting data comprising:
    sending, from a first entity to a second entity over a communications fabric, a first command that includes parameter information denoting a first data transfer rate indicating a negotiated communication rate at which the first entity communicates over a first link with the communications fabric;
    sending, from the first entity to the second entity over the communications fabric, a second command requesting that the second entity return operational information;
    responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
    performing first processing to send first data from the first entity to the second entity over the path that includes the first link, the communications fabric and the second link, said first processing including:
      determining whether the first data transfer rate of the first link between the first entity and the communications fabric is greater than the second data transfer rate of the second link between the second entity and the communications fabric; and
      responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system, and wherein data on the first storage device is migrated, by an application on the first data storage system, to a second storage device on the second data storage system, and wherein the application on the first data storage system controls migration of data of the first storage device and sends the first data to the second storage device of the second data storage system, and wherein the application has a configurable control parameter that is a limit denoting a maximum threshold at which the first data is transmitted in connection with migration over the path to the second device, wherein the second processing includes setting the configurable control parameter denoting the maximum threshold to the second data transfer rate.

15. The system of claim 14, wherein the second processing includes the first entity limiting, in accordance with the second data transfer rate, write I/O (input/output) operations and an amount of write data written by the write I/O operations.

16. The system of claim 15, wherein the first entity sends the write I/O operations at a frequency whereby an average write data transfer rate of the write data written by the write I/O operations does not exceed the second data transfer rate.

17. The system of claim 14, wherein the second processing includes:
partitioning a single application write I/O (input/output) operation that writes the first data having a first size into multiple write I/O operations each of a smaller size than the first size; and
issuing the multiple write I/O operations to the second entity at a selected frequency whereby an average write data transfer rate of the first data written by the multiple write I/O operations does not exceed the second data transfer rate.

18. The system of claim 14, wherein the communications fabric includes a switch having memory used as a buffer for temporarily storing data transmitted between the first entity and the second entity, and wherein the method further comprises:
transmitting the first data from the first entity to the second entity over the communications fabric, wherein said transmitting the first data includes:
transmitting the first data from the first entity to the switch;
storing the first data in a memory buffer of the switch; and
transmitting the first data from the memory buffer of the switch to the second entity.

19. A non-transitory computer readable medium comprising code stored thereon that, when executed, performs a method of transmitting data comprising:
sending, from a first entity to a second entity over a communications fabric, a first command that includes parameter information denoting a first data transfer rate indicating a negotiated communication rate at which the first entity communicates over a first link with the communications fabric;
sending, from the first entity to the second entity over the communications fabric, a second command requesting that the second entity return operational information;
responsive to receiving the second command, returning the operational information from the second entity to the first entity, the operational information including a second data transfer rate indicating a negotiated communication rate at which the second entity communicates over a second link with the communications fabric, wherein a path from the first entity to the second entity includes the first link, the communications fabric and the second link; and
performing first processing to send first data from the first entity to the second entity over the path that includes the first link, the communications fabric and the second link, said first processing including:
determining whether the first data transfer rate of the first link between the first entity and the communications fabric is greater than the second data transfer rate of the second link between the second entity and the communications fabric; and
responsive to determining the first data transfer rate is greater than the second transfer rate, performing second processing by the first entity that controls and limits, in accordance with the second data transfer rate, a rate at which the first data is transmitted from the first entity to the second entity over the path that includes the first link, the communications fabric and the second link, wherein the first data transfer rate of the first link between the first entity and the communications fabric is greater than the second data transfer rate of the second link between the second entity and the communications fabric, wherein the first entity is a first data storage system and the second entity is a second data storage system, and wherein the first data is stored on a first storage device on the first data storage system, and wherein data on the first storage device is migrated, by an application on the first data storage system, to a second storage device on the second data storage system, and wherein the application on the first data storage system controls migration of data of the first storage device and sends the first data to the second storage device of the second data storage system, and wherein the application has a configurable control parameter that is a limit denoting a maximum threshold at which the first data is transmitted in connection with migration over the path to the second device, wherein the second processing includes setting the configurable control parameter denoting the maximum threshold to the second data transfer rate.

\* \* \* \* \*